United States Patent
Zhao et al.

(10) Patent No.: US 9,921,511 B2
(45) Date of Patent: Mar. 20, 2018

(54) POLYMER-ENCAPSULATED METALLIC INK PARTICLES AND METALLIC ELECTROPHOTOGRAPHIC INKS

(71) Applicant: Hewlett-Packard Development Company, L.P., Houston, TX (US)

(72) Inventors: Lihua Zhao, Sunnyvale, CA (US); Yan Zhao, Palo Alto, CA (US); Doris Chun, Santa Clara, CA (US); Sivapackia Ganapathiappan, Los Altos, CA (US); Hou T. Ng, Campbell, CA (US); Albert Teishev, Rishon le-zion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/122,380

(22) PCT Filed: Apr. 28, 2014

(86) PCT No.: PCT/US2014/035701
§ 371 (c)(1),
(2) Date: Aug. 29, 2016

(87) PCT Pub. No.: WO2015/167429
PCT Pub. Date: Nov. 5, 2015

(65) Prior Publication Data
US 2016/0370726 A1 Dec. 22, 2016

(51) Int. Cl.
*G03G 9/13* (2006.01)
*C09D 11/037* (2014.01)
*G03G 9/08* (2006.01)
*G03G 9/12* (2006.01)
*G03G 9/125* (2006.01)

(52) U.S. Cl.
CPC ......... *G03G 9/131* (2013.01); *C09D 11/037* (2013.01); *G03G 9/0804* (2013.01); *G03G 9/122* (2013.01); *G03G 9/125* (2013.01)

(58) Field of Classification Search
CPC ........ G03G 9/122; G03G 9/12; G03G 9/0802; G03G 9/0804
USPC .......... 430/114, 112, 137.22, 137.19, 137.18
See application file for complete search history.

(56) References Cited

U.S. PATENT DOCUMENTS

| | | | |
|---|---|---|---|
| 3,962,397 A | 6/1976 | Narui et al. | |
| 4,241,159 A | 12/1980 | Priem et al. | |
| 4,925,763 A | 5/1990 | Tsubuko et al. | |
| 5,139,915 A | 8/1992 | Moffat et al. | |
| 6,317,947 B1 | 11/2001 | Ruschmann | |
| 6,828,020 B2 * | 12/2004 | Fisher | B32B 15/08 428/355 AC |
| 7,029,818 B2 | 4/2006 | Rohr et al. | |
| 7,078,141 B2 * | 7/2006 | Ben-Avraham | C08L 23/0853 430/114 |
| 7,232,853 B2 | 6/2007 | Nakamura et al. | |
| 7,303,619 B2 | 12/2007 | Oyanagi | |
| 8,039,183 B2 | 10/2011 | Veregin et al. | |
| 8,309,630 B2 * | 11/2012 | Chun | C09B 67/0013 106/400 |
| 8,614,039 B2 | 12/2013 | Nair et al. | |
| 2005/0090581 A1 | 4/2005 | Oyanagi | |
| 2008/0279796 A1 | 11/2008 | Handrosch et al. | |
| 2012/0196222 A1 | 8/2012 | Chun et al. | |

FOREIGN PATENT DOCUMENTS

| | | |
|---|---|---|
| GB | 1370526 | 10/1974 |
| WO | WO 2006041658 | 4/2006 |
| WO | WO 2007006481 | 1/2007 |
| WO | WO 2009070148 | 6/2009 |
| WO | WO 2013103346 | 7/2013 |
| WO | WO-2013/178268 A1 * | 12/2013 |
| WO | WO-2014/012597 A1 * | 1/2014 |

OTHER PUBLICATIONS

International Search Report and Written Opinion for International Application No. PCT/US2014/035701 dated Jan. 22, 2015, 10 pages.

* cited by examiner

Primary Examiner — Janis L Dote (74) Attorney, Agent, or Firm — Dierker & Kavanaugh, P.C.

(57) ABSTRACT

In an example of a method for making polymer-encapsulated metallic ink pigment particles, a layer of a transparent resin dispersion is disposed on a flexible substrate. The resin dispersion layer is substantially dried, and a base resin layer is formed. A slurry is disposed onto the base resin layer. The slurry includes metallic pigment particles and polymer particles dispersed in a non-aqueous carrier. The slurry is dried to form a metallic pigment-polymer sheet. Another layer of the transparent resin dispersion is disposed on the metallic pigment-polymer sheet and is dried. A coating resin layer is formed. The metallic pigment-polymer sheet and the base and coating transparent resin layers form a tri-layer film having the metallic pigment particles encapsulated between the base and coating transparent resin layers.

19 Claims, 4 Drawing Sheets

POLYMER-ENCAPSULATED METALLIC INK PARTICLES AND METALLIC ELECTROPHOTOGRAPHIC INKS

BACKGROUND

The global print market is in the process of transforming from analog printing to digital printing. Electrophotographic printing is one example of a digital printing technique. Electrophotographic printing refers to a process that provides an ink image that is electrostatically transferred from a photo imaging plate to an intermediate drum or roller, and then is thermally transferred to a substrate; or to a process where the ink image is electrostatically transferred from the photo imaging plate directly onto a substrate. In one example, the photo imaging plate is a photoconductive surface that is used to develop a hardcopy of the image. The photoconductive surface is selectively charged with a latent electrostatic image having both image and background areas. In one example, a liquid ink, which includes charged toner particles in a carrier liquid, is brought into contact with the selectively charged photoconductive surface. The charged toner particles adhere to the image areas of the latent image while the background areas remain free of ink. A hardcopy material (e.g., paper or other print substrate) is brought directly or indirectly into contact with the photoconductive surface in order to transfer the latent image. Variations of electrophotographic printing utilize different methods for forming the electrostatic latent image on a photoreceptor or on a dielectric material. Inks used in electrophotographic printing include solid color inks, clear inks, and metallic inks.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the method disclosed herein generate polymer-encapsulated (i.e., polymer-bound) metallic ink pigment particles that are suitable for use in LEP inks and printing processes. The processes disclosed herein produce micron-sized metallic pigments that are passivated or tethered with transparent resin polymers. The polymer encapsulation of the metallic pigments that results from the method(s) disclosed herein is believed to minimize the extent of exposed metallic pigment surfaces. The minimization of exposed metallic pigment surfaces suppresses the conductivity of the metallic pigment, and in turn, is believed to minimize or prevent the occurrence of the pigments coming into direct contact with i) a conductive squeegee roller in a binary ink developing unit of an LEP print engine, and ii) charged regions on a photoconductor of the LEP print engine. The minimization or avoidance of such direct contact allows the selective electrostatic transfer of the encapsulated metallic pigment particles during the LEP printing process. Exposed metallic pigment surfaces are believed to provide a conductive path in the non-aqueous carrier of the ink, which neutralizes the potential between two charged surfaces and causes undesirable development of the metallic pigment particles (which leads to an undesirably high flop index and optical density in the background of a print). Using the method(s) disclosed herein, the discharging of metallic inks is suppressed, and the transfer of metallic pigments to the background of a print is substantially avoided. This enables the LEP digital press to be operated at optimal conditions while also achieving a print that has a relatively low (<1) flop index and relatively low metallic ink in the background.

Figure 1:
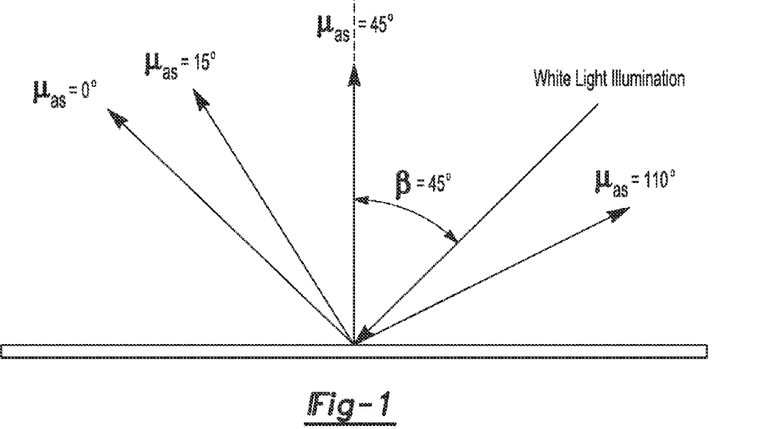
FIG. 1 is a graph illustrating an illumination angle and aspecular angles used to measure a flop index of a print including metallic pigments.

Flop index is the measure of the change in lightness of a metallic color as it is tilted through the entire range of viewing angles. Methods for measuring flop index include, for example, illuminating the printed ink containing metallic pigments under $\beta=45°$ and measuring the lightness $L^*(\mu_{as})$, for example, at three aspecular angles $\mu_{as}=15°$, $45°$, and $110°$. An equation for calculating flop index (FI) is shown as follows:

$$FI = 2.69 \cdot \frac{[L^*(\mu_{as} = 15°) - L^*(\mu_{as} = 110°)]^{1.11}}{[L^*(\mu_{as} = 45°)]^{0.85}}.$$

FIG. 1 illustrates an x-y plane and the illumination angle ($\beta=45°$) measured with respect to the x-y plane. FIG. 1 also illustrates the aspecular angles ($\mu_{as}$) of the illumination angle that are equal to $15°$, $45°$, and $110°$. Each of these angles is measured from the angle identified as $\mu_{as}=0°$, which is the aspecular measuring angle of the illumination angle.

Additionally, in the presence of a charging agent (i.e., charge director) and an electric field, the polymer-encapsulated metallic ink pigment particles exhibit mobility in dielectric media. As such, the inks including the polymer-encapsulated metallic ink pigment particles may be suitable for use in other applications, such as displays.

Figure 2:
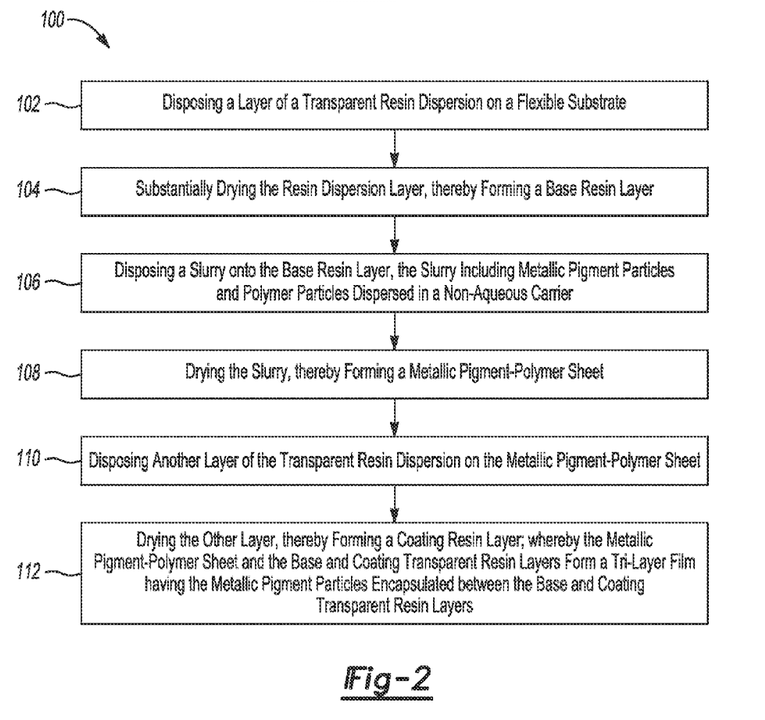
FIG. 2 is a flow diagram illustrating an example of a method for making polymer-encapsulated metallic ink pigment particles.

Referring now to FIG. 2, an example of a method 100 for forming polymer-encapsulated metallic ink pigment particles is shown. As shown at reference numeral 102, a transparent resin dispersion is disposed on a flexible substrate. As used herein, "flexible" means pliant or pliable and able to be rolled and unrolled without breaking or cracking, for example. The use of the flexible substrate allows the method(s) disclosed herein to be performed as a roll-to-roll process. Examples of the flexible substrate include polyimide, polycarbonate, polyethylene terephthalate (PET), polyethylene naphthalate (PEN), etc.

It is to be understood that the transparent resin dispersion may be disposed directly or indirectly on the surface of the flexible substrate. When disposed indirectly on the flexible substrate, a polymeric release layer may be positioned or formed on the surface of the flexible substrate, and the transparent resin dispersion may be disposed on the surface of the polymer release layer.

As will be discussed further herein, the polymer release layer acts as a sacrificial layer that releases the flexible substrate from a tri-layer film formed thereon. Removal of the polymer release layer should not deleteriously affect the flexible substrate (which can be reused) or the tri-layer film (which is further processed to form the pigment particles). Neither the flexible substrate nor the tri-layer film is water soluble, and thus it has been found that water soluble polymer(s) may advantageously be used to form the polymer release layer. The water soluble polymer may be a water soluble homopolymer or a water soluble copolymer. Some specific examples of the water soluble polymer include poly(vinyl alcohol) (PVA), polyethylene oxide (i.e., polyoxyethylene or polyethylene glycol), polyacrylamide, polyethyleneimide (PEI), or the like.

The water soluble polymer may be dissolved in water to form a solution of a sacrificial material. This sacrificial material may be coated on a surface of the flexible substrate using any suitable technique. Examples of suitable coating processes include blade coating, air knife coating, metering rod coating, size press, spin coating, curtain coating, etc. The sacrificial material may be coated to a thickness ranging from about 0.1 µm to about 5 µm. The thickness of the sacrificial material may affect subsequent coating and releasing quality and/or releasing speed.

After being coated on the flexible substrate, the sacrificial material may be exposed to a drying process to form the polymer release layer. The drying process removes most, if not all, of the water from the sacrificial material. As such, the polymer release layer is substantially dry. By "substantially dry", it is meant that at least 90% of the solvent present in the particular material or layer is driven off, volatized, or evaporated. In some instances, 95% or more of the solvent is removed. As such, in some examples, a small percentage of the solvent may remain in the polymer release layer after drying. In other instances, the polymer release layer is completely dried (i.e., 100% solvent removal). The temperature for drying the sacrificial material will depend, in part, upon the solvent used to dissolve the water soluble polymer. In some examples, the drying temperature may range from about 95° C. to about 105° C.

Drying may be accomplished using a suitable heating mechanism. The heating mechanism operates to speed up the drying of the sacrificial material (or any other material/layer that is exposed to drying). Heating may be accomplished using hot air, infrared heating, etc. Any suitable heating mechanism may be used, including an oven, a hot air dryer and/or an infrared lamp. In an example, the time for drying should be compatible with the speed of the roll-to-roll processor, so that the fabrication time is not lengthened.

Referring back to step 102, the transparent resin dispersion is disposed on the flexible substrate (or on the polymer release layer formed on the flexible substrate). The transparent resin dispersion includes a transparent polymer dispersed in a suitable non-aqueous carrier. It is to be understood that the transparent resin dispersion does not include a pigment, and may be referred to as a "white" dispersion.

In an example, the transparent polymer for the transparent resin dispersion is a thermoplastic resin. Examples of thermoplastic resins include ethylene-based polymeric resins, ethyl vinyl acetate copolymers (such as those of the ELVAX® family available from E.I. du Pont de Nemours & Co.), polybutyl terephthalate, methacrylate resins, or combinations thereof. Other thermoplastics may also be used, such as polypropylene-based polymeric resins.

Suitable ethylene-based polymeric resins include polyethylene, ethylene copolymers having a carboxylic acid functionality (e.g., copolymers of ethylene and methacrylic acid and/or acrylic acid), copolymers of ethylene and an acrylate, copolymers of ethylene and vinyl acetate, or various combinations thereof. Some examples of ethylene copolymers having a carboxylic acid functionality include those of the ELVAX II® family available from E.I. du Pont de Nemours & Co., such as ELVAX II 5720 and ELVAX II 5610. When copolymers of ethylene and an acrylate are utilized, the acrylate may be a butyl-acrylate, an ethyl-acrylate, a methyl-acrylate, or combinations thereof. Some commercially available examples of copolymers of ethylene and acrylate include ELVALOY® AC resins from E. I. du Pont de Nemours and Company. An ethylene ethyl acrylate may also be used, and some commercially available examples include those of the BAKELITE® family available from Union Carbide (e.g., DPD 6169, DPDA 6182 Natural, and DTDA 9169). Some commercially available examples of copolymers of ethylene and vinyl acetate include ELVAX® resins and BYNEL® resins from E. I. du Pont de Nemours and Company or DQDA 6479 Natural 7 and DQDA 6832 Natural 7 from Union Carbide.

Examples of suitable methacrylate resins include those of the ELVACITE® family, including polybutyl methacrylate (Grade 2044), polymethyl methacrylate (Grade 2028), and polymethyl methacrylate (Grade 2041), all of which are available from E.I du Pont de Nemours & Co.

Still other suitable resins include the NUCREL® resins (copolymers of ethylene and methacrylic or acrylic acid) from E. I. du Pont de Nemours and Company, and the A-C®, ACLYN® and ACUMIST® thermoplastic resins from Honeywell.

The polymer may be present in an amount ranging from about 15 wt % to about 40 wt % of the transparent resin dispersion. In another example, the polymer may be present in an amount ranging from about 20 wt % to about 25 wt % of the transparent resin dispersion.

The non-aqueous carrier of the transparent resin dispersion may be any suitable non-polar liquid. It is to be understood that the non-aqueous carrier that is selected for the transparent resin dispersion may also be the same non-aqueous carrier that is used throughout the process (e.g., to form the slurry and to form the final ink). Generally, the non-aqueous carrier has properties such as low odor, lack of color, selective solvency, oxidation stability, low electrical conductivity, low surface tension, desirable wetting, spreadability, low viscosity, narrow boiling point range, non-corrosive to metals, low freezing point, high electrical resistivity, high interfacial tension, low latent heat of vaporization, and low/or photochemical reactivity.

Examples of non-aqueous carriers include dielectric liquids, non-oxidative water immiscible liquids (e.g., petroleum distillates), hydrocarbon-based carriers (e.g., aliphatic—i.e., linear/acyclic or cyclic-hydrocarbons, branched-chain aliphatic hydrocarbons, etc., de-aromatized hydrocarbons, halogenated hydrocarbons, functionalized hydrocarbons, etc.), silicone oil, soy bean oil, vegetable oil, plant extracts, etc. Functionalized hydrocarbons include hydrocarbons functionalized with alcohols, acids, esters, ethers, ketones, etc.).

In an example, the non-aqueous carrier is an alkane or a cycloalkane having from 6 to 14 carbon atoms (e.g., n-hexanes, heptanes, octane, dodecane, cyclohexane etc.), t-butylbenzene, or 2,2,4-trimethylpentane. In another example, the non-aqueous carrier is selected from paraffins and isoparaffins. Examples of isoparaffins include those in the ISOPAR® family (Exxon Mobil Corp.), including ISOPAR® G, ISOPAR® H, ISOPAR® K, ISOPAR® L, ISOPAR® M, ISOPAR® V, NORPAR® 12, NORPAR® 13, NORPAR® 15, EXXOL® D40, EXXOL® D80, EXXOL® D100, EXXOL® D130, and EXXOL® D140. Other hydrocarbons that may be used as the non-aqueous carrier include those bearing the trade name SOLTROL® (available from Chevron Phillips Chemical Company) or SHELLSOL® (available from Shell Chemicals). Still further examples of the non-polar carrier include TECLEN® N-16, TECLEN® N-20, TECLEN® N-22, NISSEKI NAPHTHESOL® L, NISSEKI NAPHTHESOL® M, NISSEKI NAPHTHESOL® H, Solvent H, Solvent L, Solvent M, NISSEKI ISOSOL® 300, NISSEKI ISOSOL® 400, AF-4, AF-5, AF-6, and AF-7 (all of which are available from Nippon Oil Corp., Tokyo, JP); IP Solvent 1620 and IP Solvent 2028 (both of which are available from Idemitsu Petrochemical Co., Ltd., Tokyo, JP); AMSCO® OMS and AMSCO® 460 (both of which are available from American Mineral Spirits Co., Los Angeles, Calif.); and Electron, Positron, New II, and Purogen HF (all of which are available from Ecolink Co., Tucker, Ga.).

Any of the listed non-aqueous carriers may be used alone, or a combination of two or more of the listed non-aqueous carriers may also be used. The amount of non-aqueous carrier used in the transparent resin dispersion may range anywhere from about 60 wt % to about 85 wt % of the transparent resin dispersion.

In some examples, the transparent resin dispersion may also include a charge director (i.e., a charge/charging agent). In these examples, it is to be understood that additional charge director may also be added in the press prior to printing. Rather than being included in the transparent resin dispersion, the charge director may be added when the final metallic LEP ink is formed. As such, in some other examples, the transparent resin dispersion may not include the charge director. This example is described further below.

The charge director may be any oil soluble or dispersible low molecular weight (i.e., less than 1000 amu) molecule or oligomer that contains a charge. The charge director may be positively charged, negatively charged, or may be a zwitterion (i.e., a neutral molecule with a positive charge and a negative charge at different locations). The charge(s) may be due to the presence of a specific functional group, such as a sulfonate, sulfate, amide, carbonate, phosphate, phosphonate, nitrate, boronate, etc.

In the final ink (discussed further below), the charge director attaches to/associates with and imparts a charge to the encapsulated metallic pigment particles. Examples of suitable charge directors include aluminum stearate, lecithin, oil-soluble petroleum sulfonates (e.g., neutral calcium petronate, neutral barium petronate, and basic barium petronate), polybutylene succinimides (e.g., OLOA 1200), glyceride salts (e.g., sodium salts of phosphated mono- and diglycerides with unsaturated and saturated acid substituents), sulfonic acid salts (e.g., barium, sodium, calcium, and aluminum salts of sulfonic acid), oxyphosphate metal salts, or mixtures/combinations thereof. The sulfonic acids may include alkyl sulfonic acids (e.g., alkyl-benzenesulfonic acid), aryl sulfonic acids, sulfonic acids of alkyl succinates, and mixtures/combinations thereof.

The amount of charge director will depend, at least in part, upon the low field and high field conductivities of the final ink. In an example, the charge director may be added in an amount ranging from about 1 mg/g of non-volatile solids present in the final ink to about 20 mg/g of solids non-volatile present in the final ink. In another example, the charge director may be added in an amount ranging from about 2 mg/g of non-volatile solids present in the final ink to about 10 mg/g of non-volatile solids present in the final ink. In still another example, the charge director may make up about 1% of the final ink composition.

Disposing the transparent resin dispersion directly or indirectly on the flexible substrate may be accomplished using any suitable coating process previously described for the sacrificial material.

After being coated directly or indirectly on the flexible substrate, the transparent resin dispersion may be exposed to a drying process to form a base resin layer, as shown at reference numeral 104. The drying process removes most, if not all, of the non-aqueous carrier from the transparent resin dispersion. As such, the base resin layer is substantially dry (i.e., at least 95% of non-aqueous carrier is removed). In an example, over 98% of the non-aqueous carrier is removed from the transparent resin dispersion to form the base resin layer.

Drying may be accomplished using a suitable heating mechanism previously described. The temperature for drying the transparent resin dispersion will depend, in part, upon the non-aqueous carrier that is selected for the transparent resin dispersion. Depending in part upon the desirable drying speed, the temperature for drying the transparent resin dispersion may range from about 90° C. to about 130° C.

It is to be understood that enough of the transparent resin dispersion may be coated so that the resulting base resin layer has a thickness ranging from about 2 μm to about 5 μm.

A slurry may then be disposed on the base resin layer, as shown at reference numeral 106 of FIG. 2. The slurry includes metallic pigment particles and polymer particles dispersed in a non-aqueous carrier.

The metallic pigment particles may include particles in the form of regularly or non-regularly shaped spheres, flakes, etc. Examples of metallic pigments include aluminum flakes, aluminum silver dollars, metal oxide pigments (e.g., titanium dioxide pigments, iron oxide flakes, etc.), composite metallic pigments (e.g., metallic oxide coated metallic pigments, silicon oxide coated metallic pigments, or the like), or combinations thereof.

It is to be understood that the original morphology of the metallic pigment particles may be retained throughout the process. For instance, if the original morphology of the particles resembles flat rods or fibers, then after encapsulating the metallic pigment particles in the transparent resin, the morphology of the pigment should still resemble flat rods or fibers. The metallic pigment particles' original length ranges from about 5 μm to about 10 μm, and the original thickness ranges from about 50 nm to about 200 nm.

The amount of the metallic pigment particles that may be used in the slurry depends, at least in part, upon the total non-volatile solids content of the ink that is to be formed. In an example, the final ink may include the metallic pigments in an amount ranging from about 5 wt % to about 50 wt % with respect to the total non-volatile solids content of the ink. In another example, the final ink may include the metallic pigments in an amount ranging from about 15 wt % to about 35 wt % with respect to the total solids content of the ink. In example, the metallic pigment concentration in the slurry is about 30 wt %, but this may be further diluted depending upon the desired coating thickness to achieve the desired metallic pigment concentration in the final ink.

The polymer particles may be formed of any of the thermoplastic polymers described herein for the transparent resin dispersion. In one example, the polymer particles of the slurry are the same type of polymer as the transparent resin of the transparent resin dispersion. Using the same type of polymer in the transparent resin dispersion and the slurry may advantageously increase adhesion between the metallic pigment particles and the resin layers (i.e., the base resin layer and a coating resin layer described below). In another example, the polymer particles of the slurry are different from the transparent resin of the transparent resin dispersion. In this example, the polymer particles may be acrylic polymers or surfactants. When the polymer particles are different from the transparent resin in the transparent resin dispersion, it may be desirable to select polymer particles that will soften or partially melt at the processing temperature(s) (e.g., from about 90° C. to about 130° C.).

The polymer particles have an average particle size (e.g., diameter) that is less than 10 μm. In an example, the polymer particles have a particle size of 5 μm±3 μm. In another example, the polymer particles have a particle size ranging from about 100 nm to about 3 μm.

The amount of the polymer particles that may be used in the slurry may range from about 5 wt % to about 50 wt % of the total wt % of the slurry.

The non-aqueous carrier of the slurry is a non-polar liquid that may be chosen from any of the examples of the non-aqueous carrier of the transparent resin dispersion identified above. In one example, the non-aqueous carrier of the transparent resin dispersion is the same as the non-aqueous carrier of the slurry (e.g., both of the non-aqueous carriers are ISOPAR® L). In another example, the non-aqueous carrier of the transparent resin dispersion is different from the non-aqueous carrier of the slurry (e.g., the non-aqueous carrier of the transparent resin dispersion may be ISOPAR® L, and the non-aqueous carrier of the slurry may be TECLEN® N-16). As long as the wettability and/or surface compatibility of a deposited layer after drying is suitable for deposition of the next dispersion/slurry/etc., any non-aqueous carriers may be selected.

In an example, the non-aqueous carrier makes up the balance of the slurry. In another example, the non-aqueous carrier makes up from about 5 wt % to about 50 wt % of the total wt % of the slurry.

Disposing the slurry on the base resin layer may be accomplished using any suitable coating process previously described for the sacrificial material. It is to be understood that vacuum deposition techniques are not used for depositing the slurry. During the coating process, the metallic pigment particles generally align themselves so that their length is substantially parallel (e.g., within 30° of parallel) with a surface plane of the flexible substrate.

After being coated on the base resin layer, the slurry may be exposed to a drying process to form a metallic pigment-polymer sheet, as shown at reference numeral 108. During the drying process, the polymer particles in the slurry adhere to the transparent resin in the base resin layer. The drying process also removes most, if not all, of the non-aqueous carrier from the slurry. As such, the metallic pigment-polymer sheet is substantially dry (at least 90%, and in some instances over 98%, of the non-aqueous carrier is removed).

Drying may be accomplished using a suitable heating mechanism previously described. The temperature for drying the slurry will depend, in part, upon the non-aqueous carrier that is selected for the slurry. Depending in part upon the desirable drying speed, the temperature for drying the slurry may range from about 90° C. to about 130° C.

The metallic pigment-polymer sheet may not be a continuous film, and may include discontinuous metallic particles and polymer particles spread along the base resin layer.

As shown at reference numeral 110 in FIG. 2, another layer of the previously described transparent resin dispersion is disposed on the metallic pigment-polymer sheet. Any of the coating techniques described herein may be used to deposit the other layer of the transparent resin dispersion. It is to be understood that coating is accomplished so that any exposed surface of the metallic pigments of the metallic pigment-polymer sheet is covered by the other layer of the transparent resin dispersion.

After being coated on the metallic pigment-polymer sheet, the transparent resin dispersion may be exposed to a drying process to form a coating resin layer, as shown at reference numeral 112. During the drying process, the newly disposed transparent resin adheres at least to polymer particles in the metallic pigment-polymer sheet, and may also partially adhere to the transparent resin in the base resin layer. The drying process also removes most, if not all, of the non-aqueous carrier from the transparent resin dispersion. As such, the coating resin layer is substantially dry (at least 90%, and in some instances over 98%, of the non-aqueous carrier is removed).

Drying may be accomplished using any suitable heating mechanism previously described. The temperature for drying the other layer of the transparent resin dispersion will depend, in part, upon the non-aqueous carrier that is selected for the transparent resin dispersion. Depending in part upon the desirable drying speed, the temperature for drying the other layer of the transparent resin dispersion may range from about 90° C. to about 130° C.

It is to be understood that enough of the transparent resin dispersion may be coated so that the resulting coating resin layer has a thickness ranging from about 2 μm to about 5 μm.

Together, the base resin layer, the metallic pigment-polymer sheet, and the coating resin layer form a tri-layer film having the metallic pigment particles encapsulated between the base and coating transparent resin layers. The tri-layer film may be exposed to additional processing to obtain desirably sized particles.

When the polymeric release layer is used, the additional processing steps may include removing the tri-layer film from the flexible substrate by dissolving the polymer release layer. The polymer release layer is water soluble, and as such, water may be used to remove the polymer release layer. In an example, the flexible substrate having the base resin layer, the metallic pigment-polymer sheet, and the coating resin layer formed thereon may be placed into a water bath. In the water bath, the polymer release layer will dissolve. The dissolution of the polymer release layer releases the tri-layer film from the flexible substrate. Since neither the flexible substrate nor the tri-layer film is deleteriously affected by water, both of these components may be used after the polymer release layer is dissolved.

The flexible substrate may be cleaned and reused. For example, method 100 may be repeated using the same flexible substrate.

The tri-layer film may then be added to any example of the non-aqueous carrier disclosed herein to form a dispersion mixture, and the dispersion mixture is exposed to milling. Milling forms the polymer-encapsulated metallic ink pigment particles from the tri-layer film, and also forms a ready-to-use LEP paste. Since milling forms the LEP paste, the desired amounts of the tri-layer film and the non-aqueous carrier in the dispersion mixture will be selected so that the resulting paste has a non-volatile solids content ranging from about 15% to about 40% by weight.

The milling process disclosed herein may be a low shear milling process. Low shear milling involves agitating the dispersion mixture for a predetermined time. Agitation may be performed or controlled at any temperature below 50° C. It is desirable for the base and coating resin layers to remain solid, and thus the milling temperature is generally well below the melting point of the base and coating resin layers.

Agitation of the dispersion mixture may be accomplished using a gentle shaking process occurring at a low agitation frequency of less than or equal to 1 kHz. The low agitation frequency may be as low as 1 Hz (0.001 kHz). The agitation process disclosed herein is unlike high shearing processes, such as microfluidization, that tend to break down the pigment and change its morphology when performed in the presence of a resin. The gentleness of the shaking process is also accomplished by performing the shaking utilizing equipment where no moving parts physically contact the dispersion mixture. In this way, the agitation process is a non-impact process.

In an example, agitation of the dispersion mixture may be accomplished by shaking the mixture using pivotal shaking, orbital shaking, rotational shaking, pneumatic shaking, or combinations thereof. Shaking may be accomplished, for instance, by grasping the container containing the dispersion mixture by a person's hand, and then moving the container (in a non-violent manner that coincides with a shaking frequency of less than or equal to 1 kHz) from side to side, from front to back, in circles, etc. to perform the homogenization of the dispersion mixture. In another example, the container may be placed on an agitator set to a low frequency (again, less than or equal to 1 kHz), and the dispersion mixture may be homogenized by the agitator. A grinding media, such as beads, may be used, in a bead milling tool, as long as they are suitable for low shear processing. A mechanical mixing tool for low shear processing may also be used.

It is to be understood that homogenization is accomplished by agitation alone. In other words, no other processing steps are used to homogenize the dispersion mixture. It is further to be understood that the metallic LEP paste is formed after homogenization of the dispersion mixture is complete. Additional non-aqueous carrier could be added during homogenization in order to form the final, printable LEP ink.

Completion of homogenization of the dispersion mixture may be determined by visual inspection. For instance, the tri-layer film is a silvery color and the non-aqueous carrier is clear. Homogenization is considered to be complete when discrete pieces of the tri-layer film can no longer be seen inside the container within which the tri-layer film and non-aqueous carrier are mixed. Visual inspection may be accomplished while watching the dispersion mix during the shaking/agitating through a transparent container, or by stopping the shaking/agitating periodically and opening the container to see if any discrete pieces of the tri-layer film remain. Scanning electron microscopy (SEM) may also be used for characterization.

Milling results in the formation of the metallic LEP paste which includes the polymer-encapsulated metallic ink pigment particles. An example of the polymer-encapsulated metallic ink pigment particle formed via an example of the method 100 disclosed herein is shown in FIGS. 3A (perspective view) and 3B (cross-sectional view) at reference numeral 10.

Figure 3A:
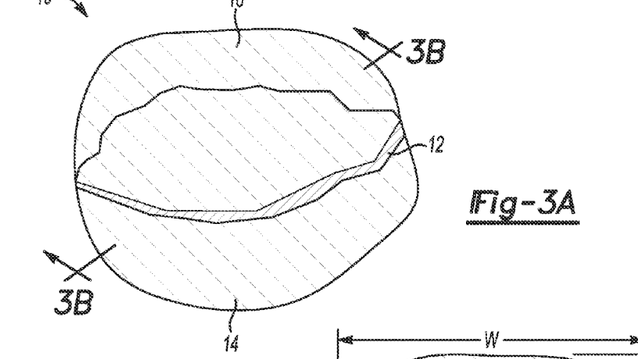
FIGS. 3A and 3B are, respectively, a semi-perspective view of an example of the polymer-encapsulated metallic ink pigment particle and a cross-sectional view of the particle taken along line 3B-3B of FIG. 3A.
Figure 3B:
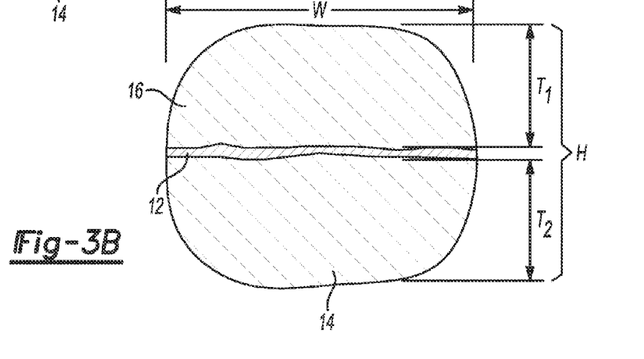

The polymer-encapsulated metallic ink pigment particle 10 shown in FIGS. 3A and 3B is a fully encapsulated metallic ink pigment particle. The polymer-encapsulated metallic ink pigment particle 10 includes the metallic pigment particle 12 sandwiched between the base resin layer 12 and the coating resin layer 16.

As illustrated in FIG. 3B, the height of the polymer-encapsulated metallic ink pigment particle 10 is the thickness $T_1$ of the coating resin layer 16 plus the thickness of the metallic pigment particle 12 plus the thickness $T_2$ of the base resin layer 14. In an example, the total thickness (represented by "H" for height) of the polymer-encapsulated metallic ink pigment particle 10 ranges from about 4 µm to about 10 µm. The width W of the polymer-encapsulated metallic ink particle 10 is about the same as the original length of the metallic pigment particle 12. The width W may be slightly increased due to base and/or resin coating layer 14, 16 along the side(s) of the metallic pigment particle 10. In an example, the total width W of the polymer-encapsulated metallic ink pigment particle 10 ranges from about 7 µm to about 8 µm. In an example, the resulting polymer-encapsulated metallic ink pigment particle 10 has an aspect ratio H:W (height:width or thickness:length) ranging from about 1:1 to about 1:5. It is to be understood that the aspect ratio may be varied by changing the thickness $T_2$, $T_1$ of the base and/or coating resin layers 14, 16 and/or by selecting a metallic pigment particle 12 having a larger or smaller length and/or thickness.

The polymer-encapsulated metallic ink pigment particles 10 include components which exhibit desirable properties for the final printable LEP ink. For example, the metallic pigment particle 12 provides the desirable color, the transparent resin in the base and coating resin layers 14, 16 provides the desirable dispersability, and the charge director (when included in the transparent resin dispersion) provides the desirable charge.

In order to make a final printable ink, additional non-aqueous carrier may be added to the metallic LEP paste, which includes the polymer-encapsulated metallic ink pigment particles 10. The amount of non-aqueous carrier that is added may depend, at least in part, on the desired total non-volatile solids for the final LEP ink. In an example, the metallic LEP paste is diluted to about 1% to about 3% NVS for printing. The dilution of the metallic LEP paste may take place during the printing process.

When the charge director is not included in the transparent resin dispersion, the charge director may be added to the final printable ink in the amounts previously described.

The metallic electrophotographic ink (i.e., the final printable ink) that is formed includes the non-aqueous carrier and the polymer-encapsulated metallic ink pigment particles 10 present in the non-aqueous carrier. Examples of the metallic electrophotographic ink include metallic pigment particles 12 in an amount ranging from about 5 wt % of total non-volatile solids in the ink to about 50 wt % of the total non-volatile solids in the ink; the transparent resin (in the form of base and coating resin layers 14, 16) in an amount ranging from about 50 wt % of the total non-volatile solids of the ink to about 95 wt % of the total non-volatile solids of the ink; the charge director associated with the surface of each of the encapsulated pigments 10; and a balance of the non-aqueous carrier.

The printable ink may be printed, for example, using any suitable liquid electrophotographic printer on any suitable medium to form a print. It is believed that the print may be formed using optimal printing conditions (for a particular printer) without generating prints with high flop indexes in the background. Rather, the prints formed using the inks disclosed herein including the polymer-encapsulated metallic ink pigment particles 10 are believed to have a background flop index equal to or less than 1, and in some instances equal to or less than 0.5. This is due, at least in part, to the metallic pigment particles 12 being encapsulated within the resin layers 14, 16 and the conductivity of the particles 12 being suppressed.

Furthermore, it is believed that the flop index of the print itself is desirably high (e.g., ranging from about 5 to about 20). This is due, at least in part, to the metallic pigments 12 within the polymer-encapsulated metallic ink pigment particles 10 being aligned with the print medium (i.e., the length is substantially parallel with a surface plane of a medium upon which it is printed). Overall, the final printable LEP ink disclosed herein exhibits desirable performance in terms of ink development, background contamination, and transferability.

To further illustrate the present disclosure, an example is given herein. It is to be understood that this example is provided for illustrative purposes and is not to be construed as limiting the scope of the present disclosure.

EXAMPLE

On a clean flexible polyimide substrate, a layer of a water soluble polymer (poly(vinyl alcohol)) was coated as a sacrificial material. After thermally drying the sacrificial material at an over temperature ranging from about 95° C. to about 105° C., a layer of polyethylene resin dispersion in ISOPAR® L was coated thereon, and heated to dry or near complete dryness. A slurry including aluminum flakes or dispersed aluminum particles and ISOPAR® L was coated on the layer of polyethylene resin and dried at an elevated temperature (from about 100° C. to about 110° C.) to form a metallic pigment-polymer sheet. Another layer of the polyethylene resin dispersion was coated over the metallic-pigment polymer sheet and was heated to dryness. This formed a tri-layer film on the polymer release layer on the flexible substrate.

Figure 4:
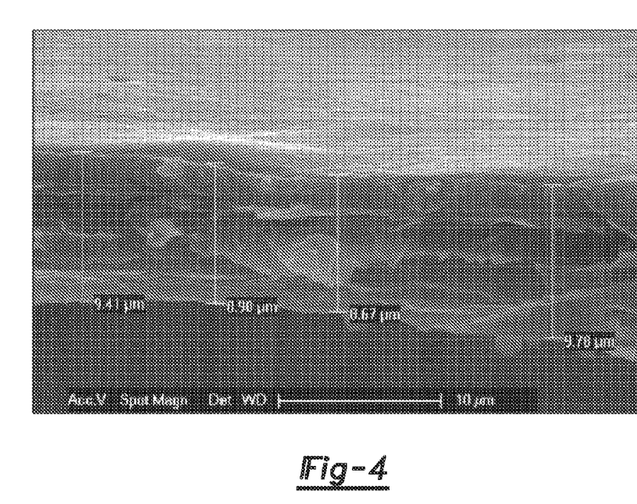
FIG. 4 is a scanning electron micrograph (SEM) image of a cross-section of a polymer-encapsulated metallic ink pigment particle that was formed via an example of the method disclosed herein.

A scanning electron micrograph of a cross-section of the tri-layer film was taken. This SEM is shown in FIG. 4. The total thickness of the tri-layer film ranged from about 8 μm to about 10 μm.

The tri-layer film was immersed into a water bath to dissolve the polymer release layer and to separate the tri-layer film from the flexible substrate. The tri-layer film was dried and milled in ISOPAR® L to form a metallic LEP paste including polymer-encapsulated metallic ink pigment particles.

The LEP paste was diluted with additional ISOPAR® L to form an ink with the NVS ranging from about 0.1% to about 0.5% by weight. Preliminary Q/M tests were carried out with this ink in a Q/m cell paper coupon. The developed paper coupon illustrated a desirable metallic appearance.

The diluted samples that were used for the Q/M test were drop-cast onto a silicon substrate followed by drying at room temperature. The polymer-encapsulated metallic ink pigment particles remaining on the silicon substrate were characterized using Energy-dispersive X-ray spectrometers (EDS)/SEM.

Figure 5A:
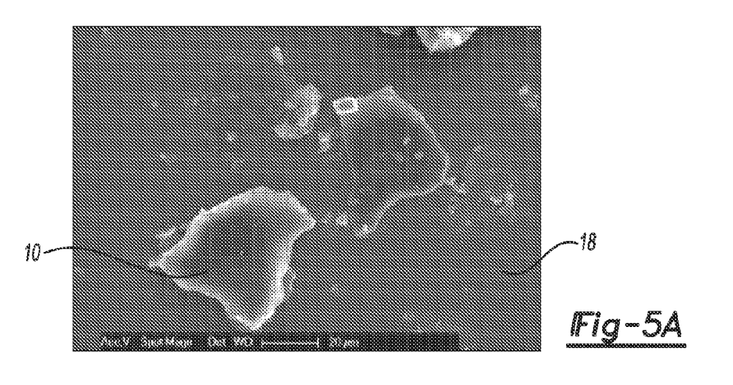
FIG. 5A is a SEM image of polymer-encapsulated metallic ink pigment particles on a silicon substrate.

FIG. 5A is a SEM of the polymer-encapsulated metallic ink pigment particles 10 on the silicon substrate 18. FIGS. 5B through 5F are black and white versions of the EDS/SEM elemental mapping images for silicon (FIG. 5B), aluminum (FIG. 5C), carbon (FIG. 5D), oxygen (FIG. 5E), and fluorine (FIG. 5F). Throughout the elemental mapping images, the bright white spots indicate the presence of the particular element.

Figure 5B:
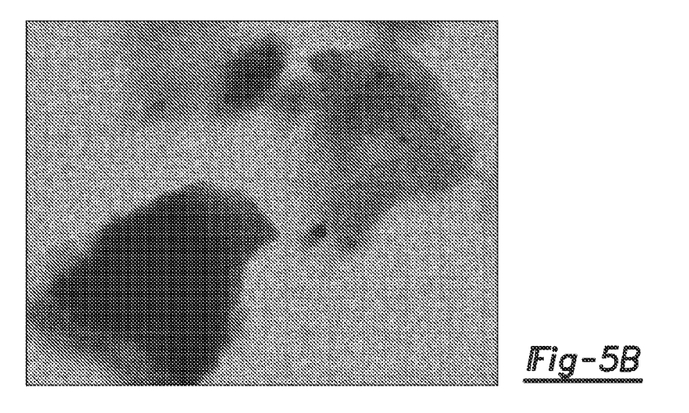
FIGS. 5B through 5F are Energy-dispersive X-ray spectroscopy (EDS) spectra of the example polymer-encapsulated metallic ink pigment particles shown in FIG. 5A.

In FIG. 5B, the elemental mapping of silicon indicates that the element is present where the substrate 18 is located and not where the polymer-encapsulated metallic ink pigment particles 10 are located. This is due to the fact that the polymer-encapsulated metallic ink pigment particles 10 do not contain silicon.

Figure 5C:
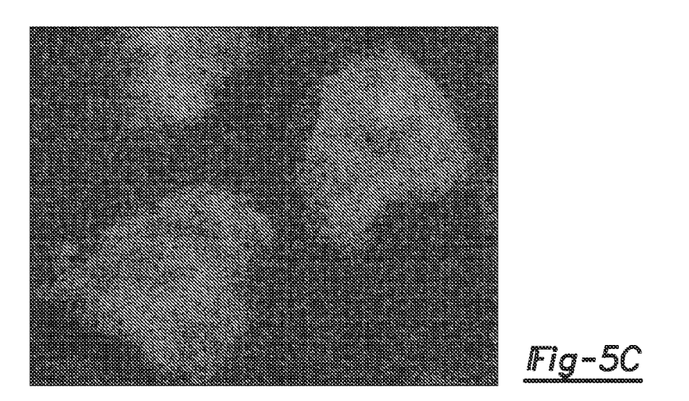

In FIG. 5C, the elemental mapping of aluminum indicates that the bulk of the element is present in the polymer-encapsulated metallic ink pigment particles 10. This is due to the aluminum flake present in the center of each polymer-encapsulated metallic ink pigment particle 10.

Figure 5D:
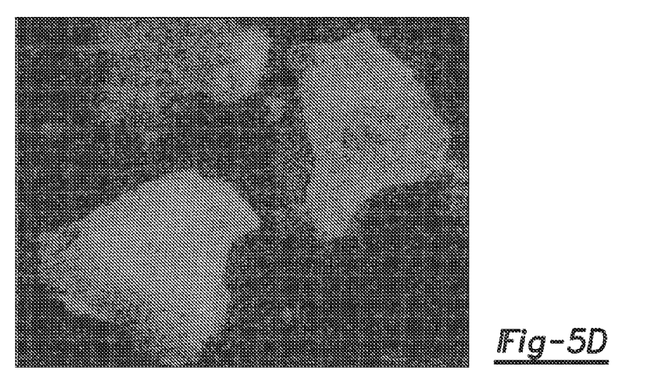
Figure 5E:
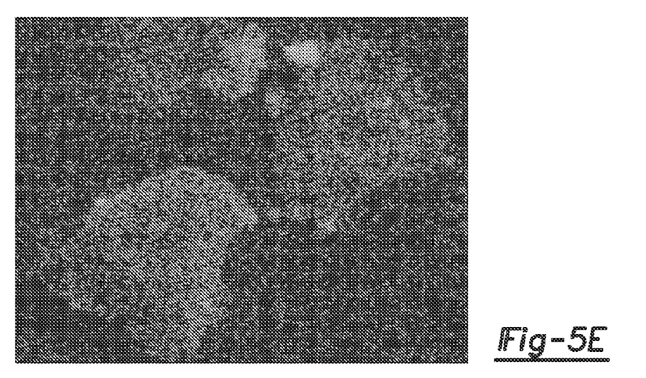
Figure 5F:
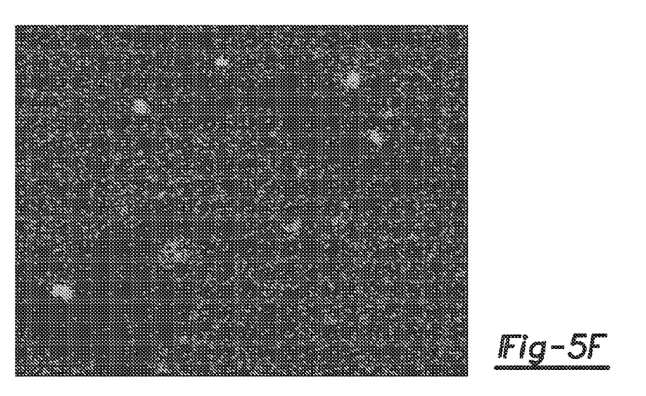

FIGS. 5D through 5F confirm the presence of the transparent resin in the polymer-encapsulated metallic ink pigment particles 10. The Indigo resin used includes carbon, oxygen, and fluorine. The bulk of both carbon and oxygen is present in the polymer-encapsulated metallic ink pigment particles 10 (FIG. 5D for carbon and FIG. 5E for oxygen). While the fluorine is not quite as concentrated as the carbon and oxygen, the brightest spots are at the same position as the particles 10 (comparing FIGS. 5A and 5F).

Cross-sectional elemental maps (not shown) also confirmed the tri-layer film structure of the particles, because carbon and oxygen were concentrated at the exterior and aluminum was concentrated near the center.

Overall, the elemental mapping confirmed the tri-layer film geometry including the metallic pigment encapsulated by the resin layers. The resin layers lock the metallic pigments inside of the polymer network. This advantageously keeps the metallic LEP ink free of uncoated metallic pigments, which can otherwise results in undesirable background development in a LEP printing process. Furthermore, the resin layers enhance the dielectric breakdown strength of the ink particles 10.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range of about 2 μm to about 5 μm should be interpreted to include not only the explicitly recited limits of about 2 μm to about 5 μm, but also to include individual values, such as 3 μm, 4.25 μm, 2.5 μm, etc., and sub-ranges, such as from about 2.1 μm to about 4.9 μm, from about 2.25 μm to about 3.75 μm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A method for making polymer-encapsulated metallic ink particles, comprising:
   disposing a layer of a transparent resin dispersion on a flexible substrate;
   substantially drying the resin dispersion layer, thereby forming a base resin layer;
   disposing a slurry onto the base resin layer, the slurry including metallic pigment particles and polymer particles dispersed in a non-aqueous carrier;
   drying the slurry, thereby forming a metallic pigment-polymer sheet;
   disposing another layer of the transparent resin dispersion on the metallic pigment-polymer sheet; and
   drying the other layer, thereby forming a coating resin layer;
   whereby the metallic pigment-polymer sheet and the base and coating transparent resin layers form a tri-layer film having the metallic pigment particles encapsulated between the base and coating transparent resin layers.

2. The method as defined in claim 1 wherein:
   prior to disposing the layer of the transparent resin dispersion on the flexible substrate, the method further comprises:
      disposing a sacrificial material on the flexible substrate; and
      drying the sacrificial material, thereby forming a polymeric release layer on the flexible substrate; and
   the transparent resin dispersion is disposed on the polymeric release layer that is on the flexible substrate.

3. The method as defined in claim 2, further comprising exposing the flexible substrate, having the polymeric release layer and the tri-layer film thereon, to water, thereby dissolving the polymeric release layer and releasing the tri-layer film from the flexible substrate.

4. The method as defined in claim 3, further comprising milling the released tri-layer film in another non-aqueous carrier, thereby forming the polymer-encapsulated metallic ink pigment particles from the tri-layer film in the other non-aqueous carrier.

5. The method as defined in claim 4 wherein milling is accomplished via a bead milling tool or a mechanical mixing tool at a temperature less than 50° C.

6. The method as defined in claim 3, further comprising reusing the flexible substrate to make more polymer-encapsulated metallic ink pigment particles.

7. The method as defined in claim 2 wherein:
   the flexible substrate is polyimide; and
   the sacrificial material is selected from the group consisting of poly(vinyl alcohol), polyethylene oxide, and polyethyleneimide.

8. The method as defined in claim 1 wherein the flexible substrate has a polymeric release layer formed thereon, wherein the transparent resin dispersion is disposed on the polymeric release layer, and wherein after the tri-layer film is formed, the method further comprises:
   dissolving the polymeric release layer in water, thereby releasing the tri-layer film from the flexible substrate; and
   milling the released tri-layer film in another non-aqueous carrier, thereby forming the polymer-encapsulated metallic ink pigment particles from the tri-layer film in the other non-aqueous carrier.

9. The method as defined in claim 8 wherein milling is accomplished via a low shear milling process at a temperature less than 50° C.

10. The method as defined in claim 1 wherein:
    the metallic pigment particles are selected from the group consisting of aluminum flakes, aluminum silver dollars, metal oxide pigments, composite metallic pigments, and combinations thereof; and
    the polymer particles of the slurry and a transparent resin of the transparent resin dispersion are formed of a same polymer.

11. The method as defined in claim 1, further comprising adding a charge director to the transparent resin dispersion.

12. The method as defined in claim 1 wherein the transparent resin dispersion includes a transparent polymer dispersed in an other non-aqueous carrier, the transparent polymer being selected from the group consisting of ethylene-based polymeric resins, ethyl vinyl acetate copolymers, polybutyl terephthalate, methacrylate resins, polypropylene-based polymeric resins, and combinations thereof.

13. The method as defined in claim 12 wherein the other non-aqueous carrier of the transparent resin dispersion is the same as the non-aqueous carrier of the slurry.

14. The method as defined in claim 1 wherein the base and coating transparent resin layers are selected from the group consisting of polyethylene, ethyl vinyl acetate copolymers, ethylene copolymers having a carboxylic acid functionality, polybutyl terephthalate, ethylene ethyl acrylate, ethylene vinyl acetate, and methacrylate resins.

15. The method as defined in claim 1 wherein the transparent resin dispersion does not include a pigment.

16. A metallic electrophotographic ink, comprising:
    a non-aqueous carrier;
    polymer-encapsulated metallic ink pigment particles present in the non-aqueous carrier, the polymer-encapsulated metallic ink pigment particles including:
       metallic pigment particles; and
       base and coating transparent resin layers having the metallic pigment particles encapsulated therebetween; and
    a charge director included in the base and coating transparent resin layers of each of the polymer-encapsulated metallic ink pigment particles;
    each of the polymer-encapsulated metallic ink pigment particles having an aspect ratio (height:width) ranging from 1:1 to 1:5.

17. The metallic electrophotographic ink as defined in claim 16 wherein:
    the metallic pigment particles are selected from the group consisting of aluminum flakes, aluminum silver dollars, metal oxide pigments, composite metallic pigments, and combinations thereof; and
    the base and coating transparent resin layers are selected from the group consisting of polyethylene, ethyl vinyl acetate copolymers, ethylene copolymers having a carboxylic acid functionality, polybutyl terephthalate, ethylene ethyl acrylate, ethylene vinyl acetate, and methacrylate resins.

18. The metallic electrophotographic ink as defined in claim 16 wherein the polymer-encapsulated metallic ink pigment particles are formed by:
    disposing a layer of a transparent resin dispersion on a flexible substrate;
    substantially drying the resin dispersion layer, thereby forming the base transparent resin layer;
    disposing a slurry onto the base transparent resin layer, the slurry including the metallic pigment particles and polymer particles dispersed in another non-aqueous carrier;
    drying the slurry, thereby forming a metallic pigment-polymer sheet;

disposing another layer of the transparent resin dispersion on the metallic pigment-polymer sheet;

drying the other layer, thereby forming the coating transparent resin layer;

whereby the metallic pigment-polymer sheet and the base and coating transparent resin layers form a tri-layer film having the metallic pigment particles encapsulated between the base and coating transparent resin layers;

removing the tri-layer film from the substrate; and milling the tri-layer film in the non-aqueous carrier.

19. The metallic electrophotographic ink as defined in claim 16 wherein the base transparent resin layer has a thickness ranging from about 2 μm to about 5 μm and wherein the coating transparent resin layer has a thickness ranging from about 2 μm to about 5 μm.

* * * * *